(12) United States Patent
Williamson et al.

(10) Patent No.: US 7,738,606 B2
(45) Date of Patent: Jun. 15, 2010

(54) SYSTEM AND METHOD FOR MAKING CORRELATION MEASUREMENTS UTILIZING PULSE SHAPE MEASUREMENTS

(75) Inventors: Ian Williamson, Calgary (CA); David Brown, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 1045 days.

(21) Appl. No.: 11/088,357

(22) Filed: Mar. 24, 2005

(65) Prior Publication Data

US 2006/0215739 A1 Sep. 28, 2006

(51) Int. Cl.
H04L 1/02 (2006.01)
(52) U.S. Cl. .................. 375/347; 375/150; 375/343
(58) Field of Classification Search ............. 375/150, 375/343, 347
See application file for complete search history.

(56) References Cited

U.S. PATENT DOCUMENTS

| 4,894,842 | A |   | 1/1990  | Broekhoven et al. |           |
|-----------|---|---|---------|-------------------|-----------|
| 5,134,407 | A |   | 7/1992  | Lorenz et al.     |           |
| 5,390,207 | A |   | 2/1995  | Fenton et al.     |           |
| 5,402,450 | A | * | 3/1995  | Lennen            | 375/343   |
| 5,414,729 | A |   | 5/1995  | Fenton            |           |
| 5,630,208 | A | * | 5/1997  | Enge et al.       | 455/65    |
| 5,654,980 | A | * | 8/1997  | Latva-aho et al.  | 375/148   |
| 5,764,686 | A |   | 6/1998  | Sanderford et al. |           |
| 5,963,582 | A |   | 10/1999 | Stansell, Jr.     |           |
| 5,990,827 | A | * | 11/1999 | Fan et al.        | 342/357.11|
| 6,031,881 | A |   | 2/2000  | Weill et al.      |           |
| 6,195,328 | B1|   | 2/2001  | Tsui et al.       |           |
| 6,236,687 | B1|   | 5/2001  | Caso et al.       |           |

(Continued)

FOREIGN PATENT DOCUMENTS

EP 0892277 1/1999

(Continued)

OTHER PUBLICATIONS

Lawrence R. Weill, Multipath Mitigation Using Moderized GPS Signals: How Good Can it Get?, Dept of Mathematics, California State University, Fullerton, pp. 493-505, ION GPS 2002, Sep. 24-27, 2002, Portland, OR.

*Primary Examiner*—Shuwang Liu
*Assistant Examiner*—David Huang
(74) *Attorney, Agent, or Firm*—Cesari and McKenna, LLP; Patricia A. Sheehan (57) ABSTRACT

A receiver utilizes an array of complex accumulation registers to form an image of the average chip shape or, as appropriate, chip edge shape, of the received signal over a specified period of time as a time series of complex power measurements. The receiver divides the length of the chip into a plurality of ranges, or bins, and, as appropriate, extends the bins to cover additional chips or portions thereof. When a sample is taken, the receiver enables the respective registers that are associated with the corresponding bin or bins, and the respective registers then accumulates the associated power measurement. The receiver uses the accumulated measurements from selected registers and/or selected groups of registers, to produce the correlation values that are needed to perform one or more correlation techniques and/or one or more multipath mitigation techniques. As appropriate, the sizes and/or starting points of the bins, and/or the selections of the bins for the various groupings may be altered, to change the spacings, locations, and so forth to which correlation values correspond.

21 Claims, 8 Drawing Sheets

U.S. PATENT DOCUMENTS

| | | | |
|---|---|---|---|
| 6,259,401 B1 * | 7/2001 | Woo .................... 342/357.12 |
| 6,370,207 B1 | 4/2002 | Weill et al. |
| 6,466,612 B2 | 10/2002 | Kohli et al. |
| 6,493,376 B1 | 12/2002 | Harms et al. |
| 6,493,378 B1 | 12/2002 | Zhodzishsky et al. |
| 6,532,251 B1 * | 3/2003 | King et al. .................. 375/142 |
| 6,636,558 B1 | 10/2003 | Schnaufer et al. |
| 6,658,048 B1 * | 12/2003 | Valio .......................... 375/150 |
| 6,751,247 B1 | 6/2004 | Zhengdi |
| 6,798,758 B1 * | 9/2004 | Chun et al. ................. 370/335 |
| 6,868,110 B2 | 3/2005 | Phelts et al. |
| 6,912,242 B2 | 6/2005 | Farine et al. |
| 6,967,992 B1 | 11/2005 | Rabaeijs et al. |
| 7,042,930 B2 | 5/2006 | Dafesh |
| 7,224,721 B2 | 5/2007 | Betz et al. |
| 7,295,633 B2 | 11/2007 | Kohli et al. |
| 7,298,324 B2 | 11/2007 | Manz |
| 2002/0181632 A1 * | 12/2002 | Kang et al. .................. 375/354 |
| 2003/0202569 A1 * | 10/2003 | Kim et al. .................... 375/150 |
| 2004/0208236 A1 * | 10/2004 | Fenton ......................... 375/148 |
| 2005/0025222 A1 | 2/2005 | Underbrink et al. |
| 2006/0018371 A1 | 1/2006 | Medlock |

FOREIGN PATENT DOCUMENTS

| | | |
|---|---|---|
| WO | WO 97/06446 | 2/1997 |

* cited by examiner

SYSTEM AND METHOD FOR MAKING CORRELATION MEASUREMENTS UTILIZING PULSE SHAPE MEASUREMENTS

CROSS-REFERENCE TO RELATED APPLICATIONS

The present application is related to U.S. patent application Ser. No. 10/823,030 entitled APPARATUS FOR AND METHOD OF MAKING PULSE-SHAPED MEASUREMENTS.

BACKGROUND OF THE INVENTION

1. Field of the Invention

The invention relates generally to systems for making correlation measurements using broadcast spread-spectrum signals and, in particular, to systems that make correlation measurements using pulse shape measurements.

2. Background Information

One example of a system that utilizes broadcast spread-spectrum signals is a global positioning system, such as, GPS, GLONASS or GALILEO systems. The system receivers determine their global positions based on the signals they receive from associated satellites. The broadcast spread-spectrum signal consists of a carrier that is modulated by at least one pseudorandom code, such as a binary PRN code that consists of a pseudo-random sequence of ones and zeros that periodically repeat. The ones and zeros in the PRN code are referred to as "code chips," and the transitions in the code from one to zero or zero to one, which occur at "code chip times," are referred to as "chip transitions." Each satellite uses a unique PRN code, and thus, a receiver can associate a received signal with a particular satellite by determining which PRN code is included in the signal.

The receiver calculates the difference between the time a satellite transmits its signal and the time that the receiver receives the signal. The receiver then calculates its distance, or "pseudo-range," from the satellite based on the associated time difference. Using the pseudo-ranges from at least four satellites, the receiver determines its global position.

To determine the time difference, the receiver synchronizes locally-generated PRN codes with the PRN codes in the received signal by aligning the code chips in respective local codes with the chips in the corresponding satellite generated PRN codes. It then determines how much the locally-generated PRN codes are shifted, in time, from the known timing of the satellite PRN codes at the time of transmission, and calculates the associated pseudoranges essentially by multiplying the measured time shifts by the speed of light. The more closely the receiver aligns the locally-generated PRN code with the PRN code in the received signal, the more precisely the receiver can determine the associated time difference and pseudorange and, in turn, its global position.

The code synchronization operations include acquisition of the satellite PRN code and tracking the code. To acquire the PRN code, the receiver generally makes a series of correlation measurements that are separated in time by, for example, a code chip, to determine when the locally-generated code aligns with the received code to within one code chip. To thereafter track the PRN code, the receiver generally makes correlation measurements that are associated with the received PRN code and early and late versions of the locally-generated PRN code. Using the early and late correlation measurements, the receiver produces an associated error signal that is proportional to the misalignment between the local PRN code and the received PRN code. The error signal is used, in turn, to control the clocking speed of the local PRN code generator, which essentially shifts the local PRN code to minimize the error signal.

The receiver also typically aligns the satellite carrier with a local carrier using correlation measurements associated with a punctual version of the local PRN code. To do this the receiver uses a carrier tracking phase lock loop.

The receiver receives not only line-of-sight, or direct path, satellite signals but also multipath signals, which are signals that travel along different paths and are reflected to the receiver from the ground, bodies of water, nearby buildings, etc. The multipath signals arrive at the receiver after the direct-path signal and combine with the direct-path signal to produce a distorted received signal. This distortion of the received signal adversely affects code synchronization operations because the correlation measurements, which measure the correlation between the local PRN code and the received signal, are based on the entire received signal—including the multipath components thereof. The distortion may be such that the receiver attempts to synchronize to a multipath signal instead of to the direct-path signal. One way to more accurately synchronize the received and the locally-generated PRN codes is to use the "narrow correlators" discussed in U.S. Pat. Nos. 5,101,416; 5,390,207 and 5,495,499. It has been determined that narrowing the delay spacing between early and late correlation measurements substantially reduces the adverse effects of noise and multipath signal distortion on the early-minus-late measurements. The narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak.

Another correlation technique makes non-zero correlation measurements near chip transitions in the locally-generated PRN code and zero valued correlation measurements otherwise. This technique, which is referred to herein as "blanked correlation," is described in U.S. Pat. No. 6,243,409.

Yet another way to more accurately synchronize the received and the locally-generated PRN codes is to use a multipath mitigation processing technique that iteratively produces estimates of the direct path signal and one or more of the multipath signals. One such technique, which uses multiple correlators arranged on either side of the correlation peak is described in U.S. Pat. Nos. 5,615,232 and 5,692,008. Another technique that uses multiple correlators is described in U.S. Pat. No. 5,414,729. Yet another multipath mitigation technique is discussed in Weill, "Multipath Mitigation Using Modernized GPS Signals: How Good Can It Get," *ION GPS* 2002, Portland, Oreg., Sep. 24-27, 2002.

The receivers and, in particular, the correlation hardware used for signal acquisition and tracking are constructed to operate with selected correlation and multipath mitigation schemes. Thus, a receiver that operates with conventional parallel early, punctual and late correlators positioned about the correlation peak includes the three correlators and associated circuitry that provides the corresponding early, punctual and late versions of the local PRN code. If the receiver instead uses multiple early and late correlators, the receiver includes a sufficient number of the correlators and the circuitry required to produce the associated versions of the local code. If a different correlation and/or multipath mitigation technique is to be used, the receiver hardware must typically be re-designed to include the necessary correlators and/or the circuitry required to produce the corresponding local versions of the PRN code.

Also, a receiver using the narrow correlation technique discussed above may require an additional set of more widely spaced correlators for use in re-acquiring the GPS code if the narrowly spaced correlators should lose lock during tracking. Thus, such a system requires two sets of early and late correlators as well as the associated circuitry to produce the corresponding versions of the GPS code.

SUMMARY OF THE INVENTION

The invention is a receiver that utilizes an array of complex accumulation registers to perform any number of correlation and multipath mitigation techniques and/or use essentially any desired delay spacing for single or multiple sets of early and late correlation measurements. The array of correlators forms an image of the average chip shape or, as appropriate, chip edge shape, of the received signal over a specified period of time. The image is expressed as a time series of complex power measurements along the length of a single chip or along a chip edge, as appropriate. The receiver manipulates selected power measurements and/or groups of selected power measurements to produce the desired correlation discrimination information, and thus, eliminates the need for the conventional parallel early and late correlator hardware and the associated circuitry for producing the corresponding versions of the local PRN code.

More specifically, the receiver includes in a receiver channel an array of complex accumulation registers. Each complex accumulation register, which consists of an in-phase accumulator and a quadrature phase accumulator, can be separately and selectively enabled. The respective complex accumulation registers accumulate measurements that are associated with signal samples that are taken from specific ranges of locations along a spread-spectrum chip, or at corresponding relative "code phase times". The array further includes a complex accumulation register that is only enabled when there is no chip transition in the local code, such that the "non-transition" accumulation register collects measurements that contain essentially only phase tacking information, or signal power.

The receiver divides the length of the chip into a plurality of ranges, or "bins," that correspond to fractions of a chip. The bins may but need not be the same size across the chip. When a sample is taken, the receiver enables the complex accumulation register that is associated with the corresponding bin. The enabled register then accumulates the related correlation measurement. As discussed in more detail below, the complex accumulation registers collect the measurements at sample times that are asynchronous with the code rate, and the ranges and the corresponding sizes and/or numbers of bins are thus fully adjustable. Accordingly, the hardware can be used with essentially any is correlation and/or multipath mitigation scheme by selectively adjusting the sizes of the ranges and/or combining the measurements associated with selected ranges, to provide appropriate discrimination information for code and carrier tracking and, as appropriate, multipath mitigation.

The same set of accumulated measurements may be selectively grouped to produce correlation values for various correlation techniques concurrently. Thus, the receiver may, using the same set of accumulated measurements, produce correlation values for one or more correlation techniques including wide spacing, narrow spacing, blanked correlation, multiple correlators, and so forth, and/or one or more multipath mitigation techniques.

As an example, the accumulated correlation measurements associated with a selected number of bins both before and after a desired code tracking point may be combined to produce early and late correlation values for essentially any desired delay spacing. Further, multiple early and late correlation values at desired spacings may be determined by selectively combining the accumulated correlation measurements associated with various groups of bins that either precede or come after the desired code tracking point, and so forth.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
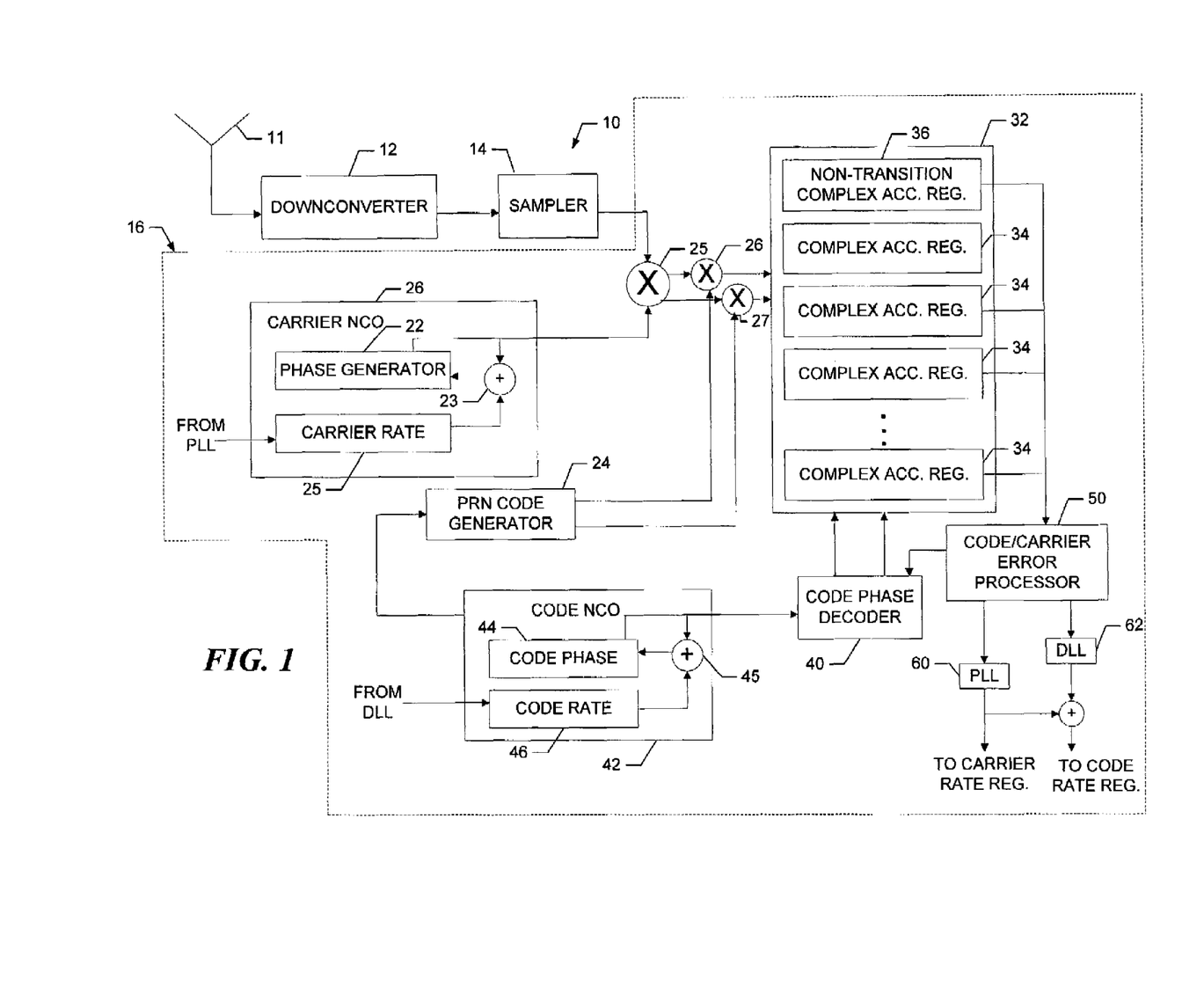
FIG. 1 is a block diagram of a spread-spectrum receiver that employs the teachings of the inventions.

Referring to FIG. 1, a receiver 10 receives a composite spread spectrum signal over an antenna 11. A downconverter 12 and sampler 14 operate in a conventional manner, to downconvert the received composite signal and, in the exemplary embodiment, take sequential I and Q samples of the downconverted signal and convert them to digital values. The sequential samples are provided to the respective channels 16 as successive I and Q samples. For convenience, a single channel 16 is depicted in the drawing.

The channel 16 includes a complex mixer 25 that removes the carrier from the I and Q samples by mixing them with an estimate of the carrier that is produced by a carrier NCO 26. The respective incoming I and Q samples are mixed with both sine and cosine transformations of the estimated carrier, to produce corresponding complex I and Q sample pairs.

As discussed in more detail below, the sample pair for a given I or Q sample is correlated with, that is, multiplied by, a locally-generated PRN code and the results are accumulated in inphase and quadrature accumulators 38 (FIG. 2) of an enabled complex accumulation register 34 in an array 32 of complex accumulation registers. The enabled complex accumulation register is associated with the sample's code phase time, or more specifically, with a range of times that include the code phase time of the sample. The range may be referred to herein also as a "bin." The component pairs corresponding to the respective I and Q samples are used to more precisely characterize the samples, which may include both real and imaginary components. The correlation measurements are accumulated over a number of code chip edges, such that the complex accumulation registers in the array contain measurements that correspond to an average chip shape or, as appropriate, average chip edge shape.

Figure 2:
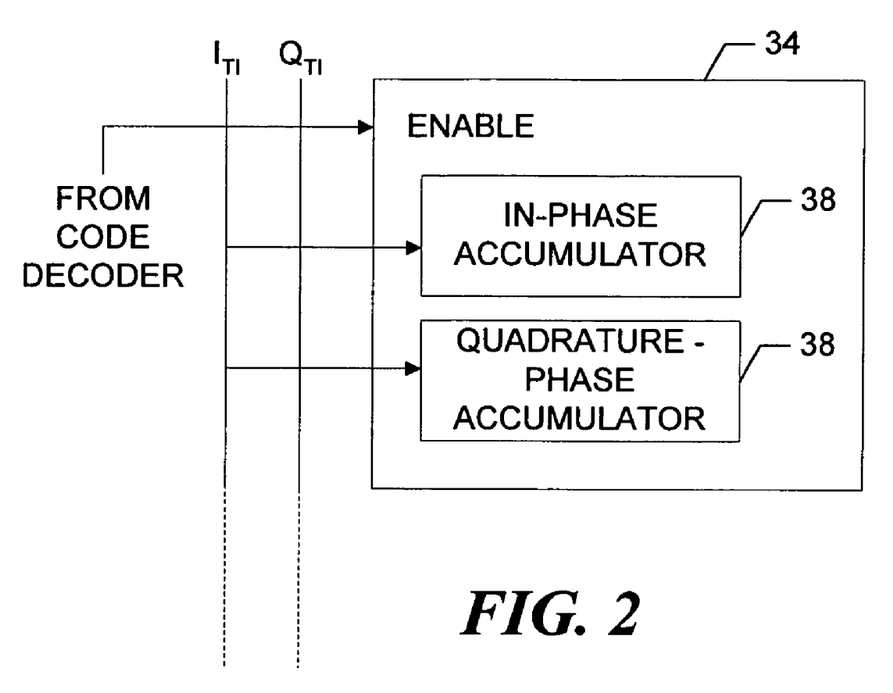
FIG. 2 is a more-detailed block diagram of a complex accumulation register that is included in the receiver of FIG. 1.

A non-transition complex accumulation register 36 accumulates the signal power measurements over the respective code chips in which there are no corresponding transitions, i.e., changes in polarity, at the chip times in the local code. These correlation measurements have essentially no code shape information, and contribute only to the total correlation power. Accordingly, the accumulated values in the non-transition complex accumulation register are used directly in the calculations relating to carrier phase tracking and as part of the punctual correlation value in the calculations relating to code tracking, as discussed in more detail below.

The carrier NCO includes a phase generator 22 that produces the carrier phase estimate. The phase generator 22 operates in a known manner and incorporates, through an adder 23, updated carrier rate information that is provided by a carrier rate register 25. The carrier rate register is, in turn, controlled by a carrier tracking error signal that is produced by a phase locked loop ("PLL") 60.

The channel 16 further includes a PRN code generator 24, which operates in a known manner to produce a locally-generated spread-spectrum PRN code that corresponds to one of the codes in the received composite signal. In the example of a GPS system, the code generator 24 produces a locally-generated PRN code that is the same as the code that is transmitted by one of the satellites then in view. In the exemplary receiver, the code generator 24 produces only an "early" version of the PRN code, that is, a version that precedes the PRN code that is transmitted by the satellite by a predetermined fraction of a code chip. The local PRN code may precede the transmitted code by 1 code chip, or one-half code chip, and so forth. For convenience, we refer herein to the locally produced early PRN code as the "local code," since the receiver requires only a single version of the PRN code. This is in contrast to conventional receivers, which require early, punctual and late versions of the PRN code.

A code numerically controlled oscillator ("CNCO") 42 drives the PRN code generator 24, to bring the local code into alignment with the received code, such that the local code precedes the received code by the predetermined code chip fraction. A code phase generator operates in a known manner to produce an estimated code phase that incorporates, through an adder 45, updated code rate information from a code rate register 46. The code rate register is, in turn, controlled by a code tracking error signal that is produced by a carrier-aided code tracking DLL 62, which operates in a conventional manner. As discussed below, the CNCO provides the estimated code phase to a code phase decoder 40, which produces signals that selectively enable the complex accumulation registers 34 and 36.

The complex I and Q samples are multiplied by the local code in multipliers 26 and 27, to produce corresponding correlation measurement signals that are then provided to the array 32 of complex accumulation registers 34 and 36. The code phase decoder 40 selectively enables the accumulation registers, such that the correlator measurements are accumulated in the appropriate accumulation registers or "bins," that is, in the accumulation registers that are associated with the code phase times that are estimated for the respective samples.

To save battery power, the code phase decoder may operate at one-half the sample rate. An offset register 41 (FIG. 3) is then included to update the code phase decoder appropriately between clock cycles. In the example, the offset register is a Q offset register that provides offset values to the code phase decoder 40 to ensure that the appropriate accumulation registers 34 and 36 are enabled to receive the correlation measurements that correspond to the code phase times of the Q samples.

Figure 3:
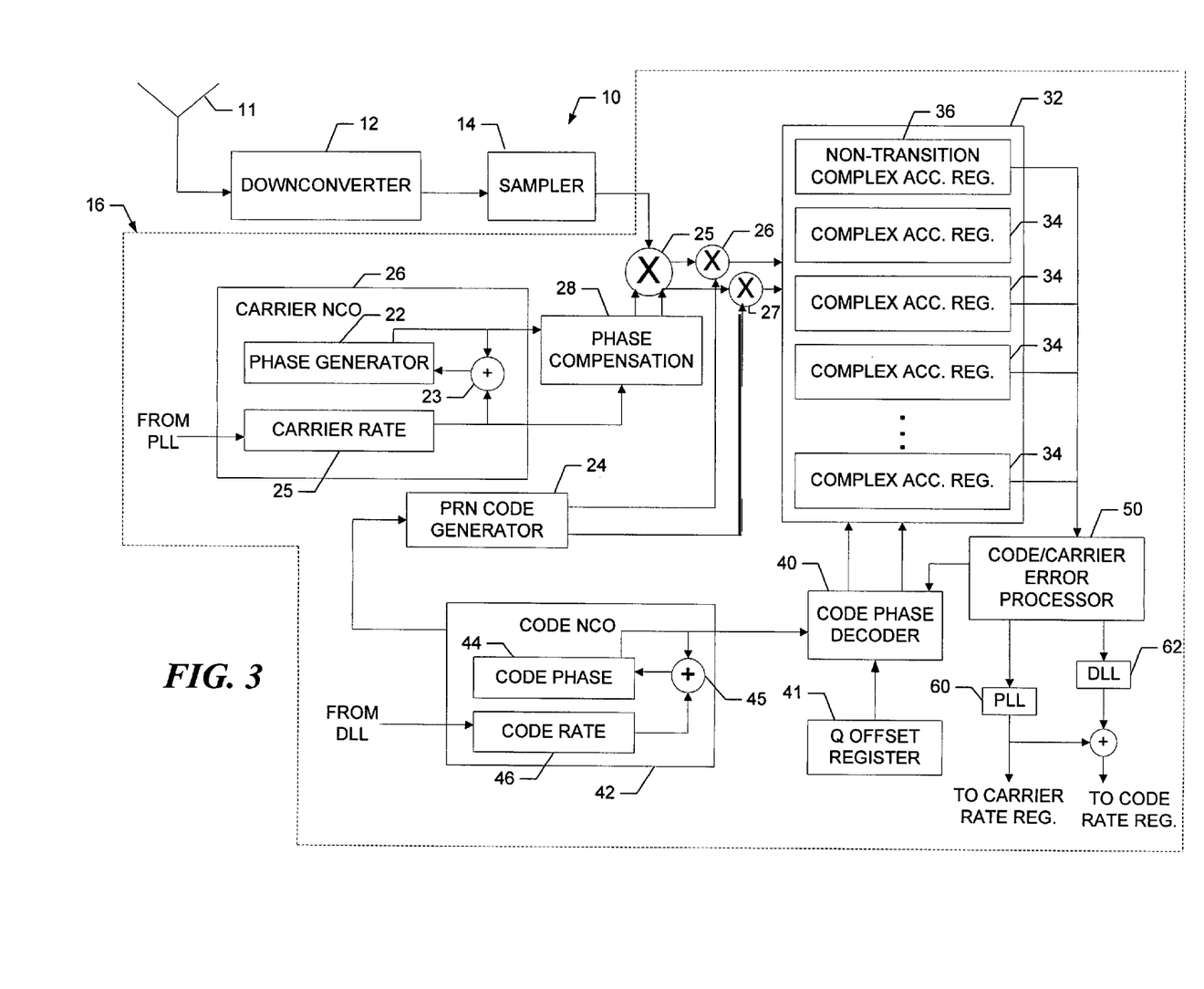
FIG. 3 is an alternative arrangement of a code phase decoder included in the receiver of FIG. 1.

Referring still to FIG. 3, the carrier NCO may similarly operate at one-half the sample rate, and include a phase compensation circuit 28 to provide to the mixer 25 the sine and cosine values for the respective I and Q samples. The mixer then produces the respective complex samples as in-phase and quadrature component pairs:

$I_{TI} = I \cos \pi_{TI}$ $Q_{TI} = -I \sin \pi_{TI}$ and $I_{TQ} = Q \sin \pi_{TQ}$ $Q_{TQ} = Q \cos \pi_{TQ}$ where TI refers to the code phase time of the incoming in-phase sample, TQ refers to the code phase time of the incoming quadrature-phase sample, $\pi_{TI}$ is the estimated carrier phase angle at the time of the incoming in-phase sample and $\pi_{TQ}$ is the estimated carrier phase angle at the time of the incoming quadrature-phase sample.

As discussed below, the receiver manipulates the accumulated values contained in respective complex accumulation registers 32 and 36 to produce code tracking discriminator information that is used in the code tracking DLL 62 and phase tracking information that is used in the carrier tracking PLL 60.

Figure 4:
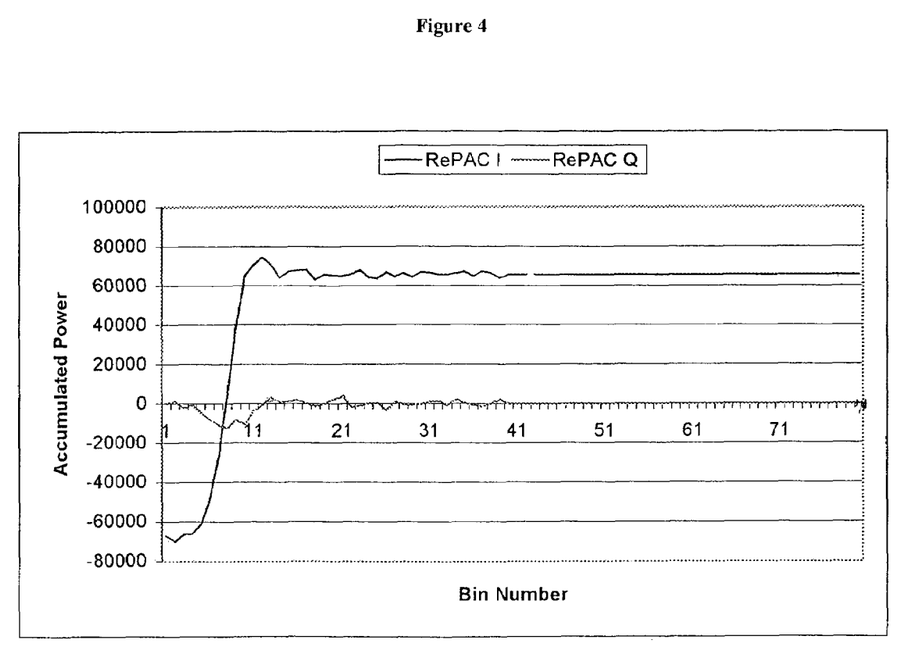
FIG. 4 is a plot of accumulated correlation measurements.

Referring now also to FIG. 4, the operations of the receiver are described in terms of an example in which a standard early-minus-late discriminator is used for the tracking of a GPS C/A code In the example the contents of the in-phase and quadrature accumulators provide the average C/A code chip edge shape, as depicted in FIG. 4 (RePAC I and RePAC Q signals). The tracking point selected for the C/A code chip transition is the zero crossing of the inphase accumulated values, which occurs in the drawing, between bins 7 and 8. A code/carrier error signal processor 50 manipulates the accumulated correlation measurements for selected bins to produce code and carrier tracking error signals, as described below.

The code/carrier error signal processor 50 calculates the standard early-minus-late discriminator as:

$$P_{E-L} = \sum_{k=p-n+1}^{p+n} A_k \qquad \text{(eqn. 1)}$$

where 2n is the desired early-late delay spacing represented as a number of bins, p is the bin number that designates the desired code tracking point, i.e., the code tracking point falls between bins p and p+1, and $A_k$ is the complex value contained in bin k's in-phase and quadrature-phase accumulators. The summation is a complex addition operation, with the contents of the in-phase and the quadrature accumulators of bin k as the real and the imaginary components, respectively, of the corresponding complex value $A_k$. Further, the values $A_k$ are normalized to accommodate different ranges or bin sizes.

The processor 50 may use various values of n, that is, numbers of bins on either side of the designated code tracking point, to produce early-minus-late discriminator information associated with desired correlator spacings. For example, the discriminator information associated with a narrower spacing is calculated using a smaller number of bins, i.e., using a smaller value of n. Alternatively, or in addition, the processor may reduce the sizes of the bins, that is, shorten the lengths of the associated ranges, such that combinations of n early bins and n late bins produces a discriminator value that corresponds to a desired narrower early-late spacing. If a wider spacing is required to, for example, re-acquire the code, the processor may instead use a larger value for n, that is, use accumulated values from greater numbers of bins. Alternatively, or in addition, the processor may widen the bins. Further, the processor may change the starting points of the bins, such that the bins are moved to, for example, associate the code tracking point with the complex accumulation register 34 that is in the center of the array 32.

Further, if the spacing of the bins, that is, the spacing between the starting points of the bins or alternatively the mid-points of the bins, is greater than or equal to the spacing of samples taken at the Nyquest rate, the system may mathematically manipulate, for example, interpolate, between the accumulated values that correspond to the bins. This produces a chip edge shape with greater granularity, without sacrificing precision. The intermediate values, determined in the example by the interpolation, may then be used in calculations in place of or in addition to the accumulated values. Accordingly, the value "n" in the calculations is expanded to include intermediate bins which correspond to the interpolated values. The selected delay spacing is thus not limited by the relative spacings or sizes of the bins that are associated with the accumulation registers.

The code/carrier error processor 50 calculates the punctual accumulation value that is used for determining the code error signal as:

$$P_P = \sum_{k=p+1}^{N} A_k - \sum_{k=1}^{p} A_k + A_{NT} \quad \text{(eqn. 2)}$$

where p again designates the desired code tracking point, N is the total number of transitional bins and $A_{NT}$ is the complex value in the "non-transitional" accumulation register. The punctual correlation value could be determined without the accumulated non-transition value, that is, without $A_{NT}$. If, however, a GPS C/A code is being tracked one-half of the associated signal power is essentially lost without $A_{NT}$ because the C/A code transitions at only one-half of the code chip times in a code epoch.

The code error, $C_{error}$, from a standard Normalized Dot Product DLL Discriminator is then:

$$C_{error} = \frac{I_P I_{E-L} + Q_P Q_{E-L}}{I_P^2 + Q_P^2} \times chipsize \quad \text{(eqn. 3)}$$

where $I_P$ and $Q_P$ are, respectively, the in-phase and quadrature-phase components of the complex punctual accumulation value $P_P$ and $I_{E-L}$ and $Q_{E-L}$ are the in-phase and quadrature-phase components of the complex early-minus-late discriminator, $P_{E-L}$. The chip size is included in the calculation to normalize the error value, since various codes, e.g., the GPS C/A code and P code, have different chip sizes. The processor 50 provides the code error signal to the DLL 62, which then operates in a conventional manner to produce the error signal that controls the code rate register 46.

The code/carrier error signal processor determines the carrier phase error using an arctangent-like function:

$$\text{Phase Error} = \arctan\left[\frac{\left(\sum_{k=p+1}^{N} I_k - \sum_{k=1}^{p} I_k + I_{NT}\right)^2}{\left(\sum_{k=p+1}^{N} Q_k - \sum_{k=1}^{p} Q_k + Q_{NT}\right)^2}\right] \quad \text{(eqn. 4)}$$

where $I_k$ and $Q_k$ are the in-phase and quadrature-phase components of the complex value that is contained in the complex accumulation register that corresponds to bin k and $I_{NT}$ and $Q_{NT}$ are the in-phase and quadrature-phase components of the complex value that is contained in the non-transitional complex accumulation register.

The phase error signal is used by the PLL 60 in a conventional manner, to produce the phase tracking error signal that controls the carrier NCO phase generator 22. The phase error calculation uses the accumulated values from all of the complex accumulator registers, including the "non-transition" complex accumulation register 36. While the phase error could be determined without the accumulated non-transition value, as discussed above, one-half of the associated signal power is essentially lost because the C/A code transitions at only one half of the code chip times in a code epoch.

Referring again to FIG. 1, the CNCO 42 produces chip-edge clock signals that are used to align the phase of the locally-generated PRN code to the received PRN code, to within the predetermined fraction of a chip. The CNCO also produces fine code chip phase detail signals, which represent the estimated code chip times of respective incoming I and/or Q samples, and provides these signals to the code phase decoder 40.

The code phase register 44 at any given time contains a count that corresponds to the estimated code phase, that is, to an estimated code phase time. When the count corresponds to the start of a new chip, the code phase register provides a signal to the code generator 24, which then produces the next chip of the locally generated code. The signal produced by the code phase register is synchronous with chip times in the local PRN code, which in the example is the early code version. At every sample clock time the code phase register also provides the code phase time value to the code phase decoder 40, which controls the enabling of the complex accumulation registers 32.

Figure 5A:
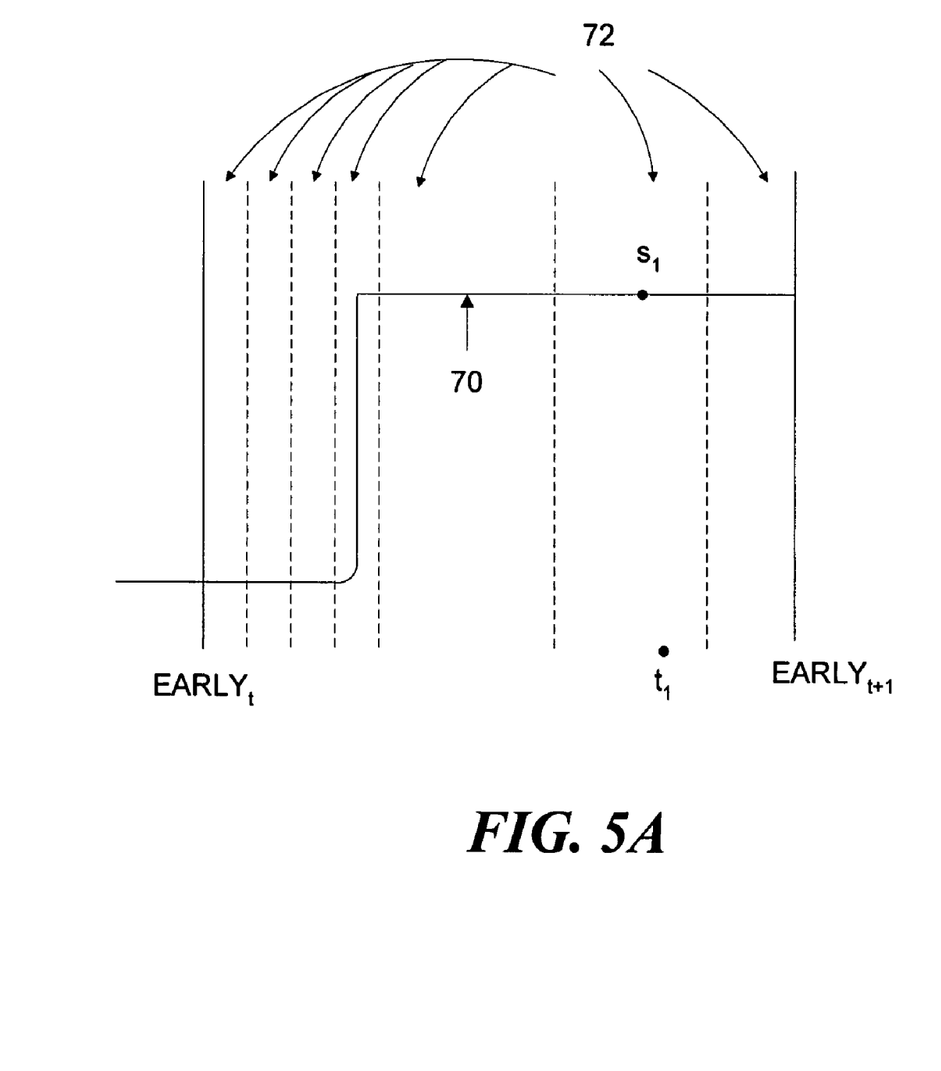
FIGS. 5A and 5B are illustrations of code chip ranges.
Figure 5B:
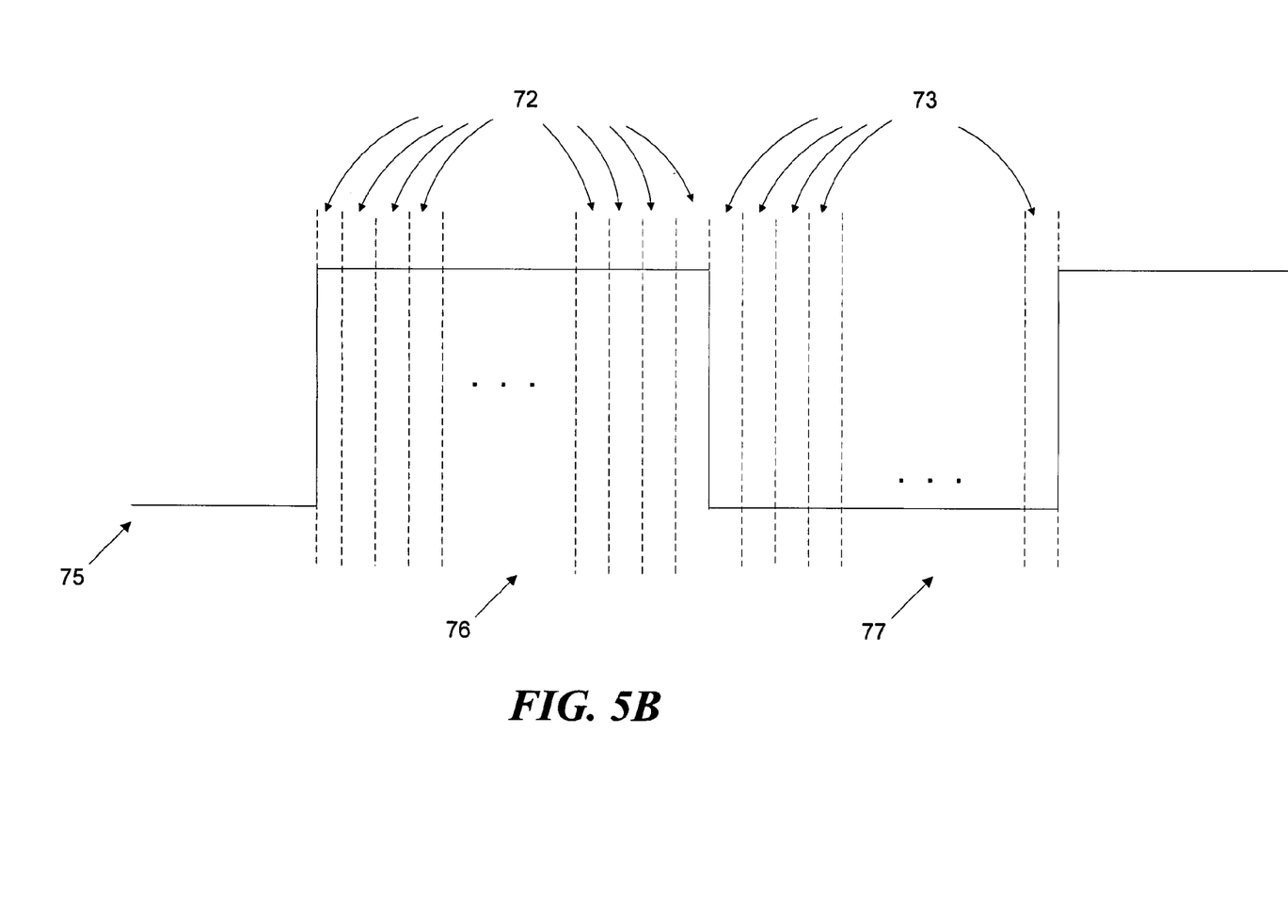

Before discussing the operations of the code phase decoder 40 in more detail, we refer to FIGS. 5A and 5B to describe the code chip ranges that are associated with the accumulation registers 32. As shown in FIG. 5A, a code chip 70 is segmented into a plurality of code chip ranges or bins 72, each of which is a fraction of a code chip. The sample $s_1$ taken at time $t_1$ has a code chip time that is included in a range that covers the middle of the chip. The ranges near the chip rising edge may be smaller than the ranges that are near the middle of the chip, as appropriate.

Referring also to FIG. 5B, the bins 72, may extend up to the falling edge of the chip, and bins 73 may extend beyond the falling edge of the chip and even over multiple chips. The bins 72 that cover the falling edge and the bins 73, as appropriate, may be used in wide correlation techniques, such as techniques that involve delay spacings of one or more chips. For wide correlation the bins at or near the falling edge of the chip may be used to produce early signals or, with a flipped sign, late signals, depending on the desired spacing. The values from bins 73 may be used to calculate correlation values that correspond to delay spacings of greater than 1 chip to provide a larger pull-in region for signal acquisition and tracking in noisy and/or high dynamic environments. Further, as described in more detail with reference to FIG. 7 below, the values from bins associated with multiple chips may also be used to more fully characterize multipath signals.

Figure 6:
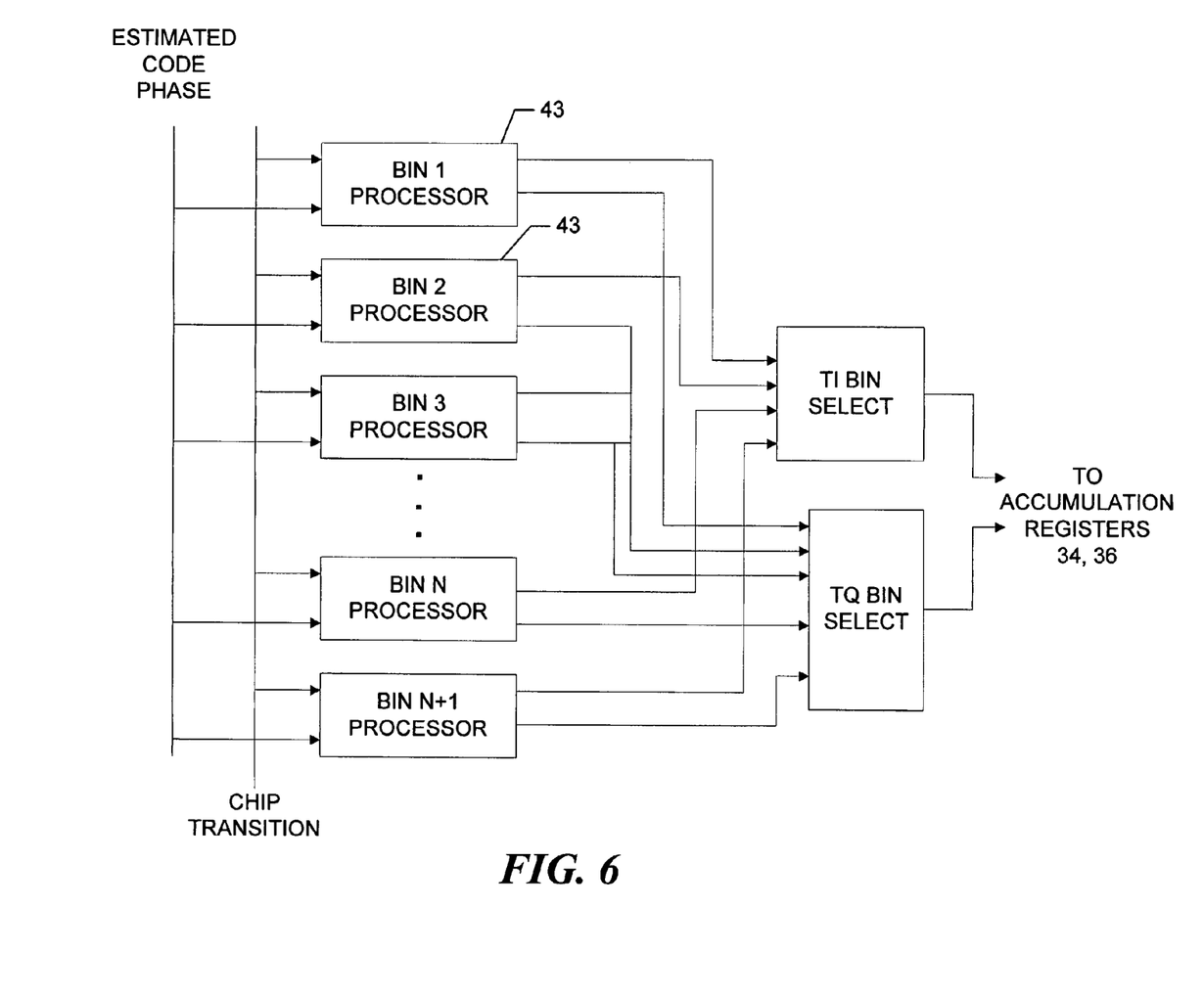
FIG. 6 is a more detailed block diagram of the code phase decoder included in the receiver of FIG. 1.

Referring also to FIGS. 2 and 6, at each pulse of the sample clock, the code phase register 44 provides to the code phase decoder 40 a code phase time value that corresponds to the estimated position of the corresponding sample relative to the underlying code chip. Thus, at sample time $t_1$ (FIG. 4), the code phase register provides to the code phase decoder a code phase time value that corresponds to the sample's mid-chip position. As depicted in FIG. 6, the code decoder includes a plurality of bin processors 43 that collectively determine which bin contains the code phase that is estimated for the current sample. The processor 43 that corresponds to the appropriate bin provides signals that enable the associated complex accumulation register 34, such that the register can then add the correlation measurement values to the contents of the inphase and quadrature accumulators 38.

The processors 43 may, for example, compare the estimated code phase time with upper and lower bin boundary values that define the range or extent of the bin in terms of code phase times. The upper and bin boundary lower values may be readily altered, to enlarge or reduce the extent of the associated ranges. The bin boundary values may instead or in addition be selectively altered for particular bins to, for example, use smaller ranges for the bins that are nearest to the chip edge, and so forth.

The range upper and lower bin boundary values are provided by the code/carrier error signal processor 50. The processor may adjust the ranges based on the relative sizes of the code and phase errors. The processor may, for example, reduce the sizes of certain or all of the ranges once the code tracking error signal is sufficiently small to indicate tracking to with one code chip, and further reduce the ranges as the tracking error decreases. In addition, as discussed above, the processor may interpolate between bins to provide correlation values that are more closely spaced. In this way, the processor takes advantage of the increased tracking accuracies of narrow correlation. Alternatively, the processor 50 may take advantage of the narrow correlation simply by utilizing the measurements from fewer bins and/or utilizing interpolated values, without changing the sizes of the ranges.

The code generator 24 may also produce a chip transition signal, which may be used to assert an enable signal for the complex accumulation register 36. Following a code chip time in which there is no polarity change or transition in the locally generated code, for example, a chip transition signal is asserted and remains asserted for the entire chip to enable the non-transition accumulation register 36 and disable the other registers 34. The chip transition signal is not asserted at the start of a chip if there is a transition in the local code, and the register 36 is then disabled, while the registers 34 are enabled as a group and can then be selected based on the estimated code phase times of the respective samples. The non-transition complex accumulation register thus accumulates all of the correlation measurements associated with the non-transitioning code chips, and the other registers 34 selectively accumulate the measurements associated with the remaining code chips.

Different discriminator functions may be used at different times during tracking operations, simply by manipulating the accumulated values from different groups of bins and/or using different manipulation functions. As discussed earlier, an early-late discriminator function with reduced spacing, that is, narrower correlation, may be used by including a smaller value for n in equation 1, and thus, using the accumulation values from fewer "early" and "late" bins. If the tracking loop loses lock, the spacing may be immediately increased by using a larger value for n in equation 1, and thus, using the accumulation values from more of the early and late bins.

Multiple early and/or late values, which correspond to multiple sets of early and late correlator hardware in a conventional receiver, may be determined at any time by selectively grouping the bins. Accordingly, correlation values that correspond to conventional correlators at locations that are ½ chip and ¼ chip early, respectively, can be readily determined concurrently by selectively combining the contents of the accumulators to obtain values associated with bins that span the desired ranges—in the example, a ½ chip early value may be produced by $$P_{\frac{1}{2}} = \sum_{k=p-1}^{N} A_k - \sum_{k=1}^{p-2} A_k + A_{NT}$$

while values for ¼ chip spacing may be produced by $$P_{\frac{1}{4}} = \sum_{k=p}^{N} A_k - \sum_{k=1}^{p-1} A_k + A_{NT}$$

and so forth, assuming that bin p-2 begins one-half chip before the designated code tracking point and bin p-1 begins one quarter chip before the designated code tracking point. The number of correlation values and the spacings of the multiple correlation values may be readily changed by re-grouping and/or re-sizing the bins. Thus, the receiver may operate as if it includes hardware that consists of any number of conventional correlators and/or correlator pairs. Further, the system may operate as if the correlators are placed in any number of locations relative to the correlation peak, and may further operate as if the number, locations and/or spacing of the correlators have changed. Alternatively, or in addition, the receiver may at the same time selectively group the accumulated measurements to produce the correlation values used in blanked correlation and/or other correlation techniques. Further, the interpolated values may be combined with or used instead of the accumulated values in calculations, to provide values associated with desired spacing and/or "placement" of the correlators.

The accumulated measurements from the respective registers may also be provided at appropriate times to a multipath mitigation technique (mmt) processor 80 (FIG. 7), which then processes the measurements in accordance with known multipath mitigation techniques. The multipath mitigation processor thus determines at least an estimate of the location of the chip edge of the direct path signal based on the accumulated pulse shape measurements contained in the array of complex accumulators. The multipath mitigation processor may also produce carrier tracking and code tracking multipath error signals that are then used in a conventional manner in the DLL 62 and PLL 60, to remove adverse affects of multipath from the code and carrier tracking operations.

Figure 7:
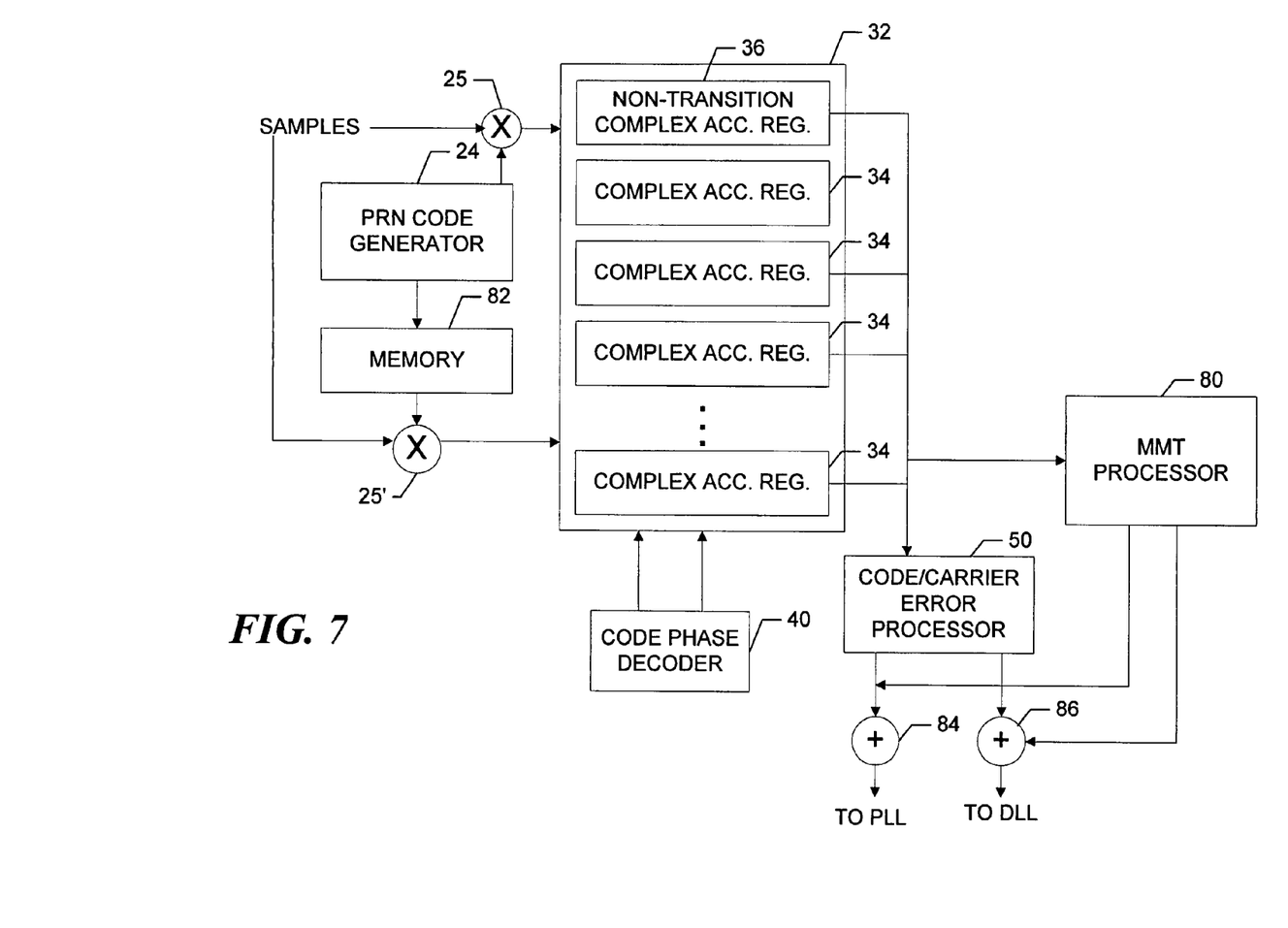
FIG. 7 is a block diagram of the receiver of FIG. 1 further including multipath mitigation processing elements.

Referring now also to FIGS. 5B and 7, as an example, the system accumulates correlation measurements that correspond to two chips 76 and 77 in the local PRN code 75. The bins 72 accumulate measurements that correspond to the duration of a code chip, while the bins 73 accumulate measurements that correspond to what are the later contributions associated with the same code chip in one or more multipath signals. Thus, the samples taken during local code chip 76 are correlated with the local code chip 76 and accumulated in bins 72. When the local code transitions to chip 77, the samples are correlated with, that is, multiplied by, both the local code chip 77 in multiplier 25 and, in multiplier 25', the local code chip 76, which is stored in memory 82. The values produced using the local code chip 77 are accumulated in the appropriate bins 72, and the values produced using the stored code chip 76 are accumulated in the appropriate bins 73. The bins 73 thus provide a shape associated with the ends of the code chips in the received multipath signals. The accumulated values from the bin 72 and 73 may then be used by the MMT processor 80, to produce an estimate of at least a direct path signal using the multipath mitigation processing techniques described above. The MMT processor 80 then provides multipath mitigation signals to the PLL 60 and the DLL 62 through adders 84 and 86. The MMT processor 80 may instead operate with accumulated values that correspond to delay spacings of 1 chip or less and/or with interpolated values.

The code phase decoder 40 and bin processors 43 (FIG. 6) operate together to enable the accumulation registers 34 that correspond to the appropriate bins 72 and 73. The bin processors 43 thus enable two registers for a given sample, one for the appropriate bin 72 and one for the appropriate bin 73, when the bins extend beyond 1 chip.

If the bins span three code chips, for example, the system produces correlation values by multiplying the samples by the current local code chip and stored values of the two previous code chips. The values associated with the current local chip are accumulated in bins 72, the values associated with the previous code chip are accumulated in bins 73 and the values associated with a second previous chip are accumulated in a set of bins (not shown) that are spaced two chips from bins 72 (one chip from bins 73), and so forth. The bin processors 43 thus operate to enable the appropriate number of bins for each signal sample. The receiver does not drive the sample clock to take samples at pre-determined times relative to the estimated code chip boundaries. This allows the receiver to enlarge or reduce the relative sizes of respective bins, or ranges, such that samples are spread over more bins or fewer bins, as appropriate, to provide, for example, a more detailed chip edge shape from which to determine the zero crossing or code tracking point and respective early and late correlation values.

The receiver may concurrently produce the different correlation measurements that are used in various correlation techniques by selectively grouping the bins. Using appropriately set bin boundaries, the receiver may thus produce from the same set of accumulated measurements the correlation values associated with wide spacing, narrow spacing, blanked correlation, and/or other correlation techniques, as well as the correlation values associated with various multipath mitigation techniques, such as, for example, the techniques involving multiple early and late correlation values.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention, including sampling the received signal to produce simultaneous I and Q samples. The simultaneous samples are then processed in parallel, since corresponding I and Q samples will always occur in the same code chip range or bin. The range or bin sizes may be fixed and the complex accumulators may be selectively enabled by logic that is controlled directly by the code phase time values. The early measurements, that is, the results of multiplying the downconverted complex signal and the early version of the local PRN code, are used for the complex-accumulators 32 in the embodiment described herein. However, the punctual or late measurements may instead be used, as long as the edge-detect signal is made synchronous with the selected measurements. The receiver operations may be performed in software and/or firmware, and processors that are depicted separately may be combined with other processors and/or individual processors may instead consist of multiple processors.

What is claimed is:

1. A correlation subsystem for a receiver that receives spread-spectrum signals, including:
   an array of complex accumulation registers that over multiple code chips accumulate correlation measurements that correspond to samples of the received signal at sample times that are asynchronous to code rate, the complex accumulators being associated with code chip ranges that span all or a portion of one or more code chips;
   a code phase decoder that controls the complex accumulation registers to direct respective correlation measurements to the complex accumulation registers that are associated with the code chip ranges from which the samples are taken, the code phase decoder decoding values that correspond to estimated code phase times of the samples; and
   a processor for
      selectively combining the accumulated values from two or more accumulation registers to produce correlation values for use in one or more correlation techniques, multipath mitigation techniques, or both, with
      a given code range that is associated with a code tracking point and a number of ranges both before and after the given range being selected for combining to determine a punctual correlation value and
   a code error is determined as:

$$C_{error} = \frac{I_P I_{E-L} + Q_P Q_{E-L}}{I_P^2 + Q_P^2} \times chipsize$$

where $I_P$ and $Q_P$ are the in-phase and quadrature-phase components of the complex punctual accumulation value $P_P$ and $I_{E-L}$ and $Q_{E-L}$ are the in-phase and quadrature-phase components of the complex early-minus-late discriminator $P_{E-L}$.

2. The correlation subsystem of claim 1, wherein the code chip ranges over which the accumulated values are combined are selected to produce one set or multiple sets of early and late correlation values.

3. The correlation subsystem of claim 2, wherein the code chip ranges are adjustable to provide one or more desired delay spacings.

4. The correlation subsystem of claim 2 wherein one or all of the sizes, numbers and staffing points of the code chip ranges are selectively varied to provide one or more desired delay spacings.

5. The correlation subsystem of claim 4 wherein the number of code chip ranges selected for combining in a given combination is increased to widen one or more of the delay spacings or decreased to narrow one or more of the delay spacings.

6. The correlation subsystem of claim 2 wherein the processor further manipulates the correlation values to produce early minus late code tracking discriminator information.

7. The correlation subsystem of claim 1 wherein the array further includes a non-transition complex accumulation register that accumulates correlation measurements associated with a code chip when the code does not transition at a chip time.

8. The correlation subsystem of claim 7 wherein a phase error is determined as:

$$\text{Phase Error} = \arctan\left[\frac{\left(\sum_{k=p+1}^{N} I_k - \sum_{k=1}^{p} I_k + I_{NT}\right)^2}{\left(\sum_{k=p+1}^{N} Q_k - \sum_{k=1}^{p} Q_k + Q_{NT}\right)^2}\right]$$

where $I_K$ and $Q_K$ are the in-phase and quadrature-phase components of the complex value that is contained in the complex accumulation register that corresponds to bin k and $I_{NT}$ and $Q_{NT}$ are the in-phase and quadrature-phase components of the complex value that is contained in the non-transitional complex accumulation register.

9. The correlation subsystem of claim 7 wherein the punctual correlation value is determined as:

$$P_P = \sum_{k=p+1}^{N} A_k - \sum_{k=1}^{p} A_k + A_{NT}$$

where p is the bin that is associated with the code tracking point, N is the total number of transitional bins, $A_k$ is the complex value contained the in-phase and quadrature-phase accumulators corresponding to bin k and $A_{NT}$ is the complex value contained in the non-transitional accumulation register.

10. A correlation subsystem for a receiver that receives spread-spectrum signals, including:
   an array of complex accumulation registers that over multiple code chips accumulate correlation measurements that correspond to samples of the received signal at sample times that are asynchronous to code rate, the complex accumulators being associated with code chip ranges that span all or a portion of one or more code chips;
   a code phase decoder that controls the complex accumulation registers to direct respective correlation measurements to the complex accumulation registers that are associated with the code chip ranges from which the samples are taken, the code phase decoder decoding values that correspond to estimated code phase times of the samples; and
   a processor for selectively combining the accumulated values from two or more accumulation registers to produce correlation values for use in one or more correlation techniques, multipath mitigation techniques or both, and the number of code chip ranges selected for combining is reduced to narrow one or more of the delay spacings, or increased to widen one or more of the delay spacings, and the array further includes a non-transition complex accumulation register that accumulates correlation measurements associated with a code chip when the code does not transition at a chip time, and,
   a phase error is determined as:

$$\text{Phase Error} = \arctan\left[\frac{\left(\sum_{k=p+1}^{N} I_k - \sum_{k=1}^{p} I_k + I_{NT}\right)^2}{\left(\sum_{k=p+1}^{N} Q_k - \sum_{k=1}^{p} Q_k + Q_{NT}\right)^2}\right]$$

where $I_K$ and $Q_K$ are the in-phase and quadrature-phase components of the complex value that is contained in the complex accumulation register that corresponds to bin k and $I_{NT}$ and $Q_{NT}$ are the in-phase and quadrature-phase components of the complex value that is contained in the non-transitional complex accumulation register.

11. The correlation subsystem of claim 10 wherein a given code range that is associated with a code tracking point and a number of ranges both before and after the given range are selected for combining to determine a punctual correlation value.

12. The correlation subsystem of claim 11 wherein a code error is determined as:

$$C_{error} = \frac{I_P I_{E-L} + Q_P Q_{E-L}}{I_P^2 + Q_P^2} \times chipsize$$

where $I_P$ and $Q_P$ are the in-phase and quadrature-phase components of the complex punctual accumulation value $P_P$ and $I_{E-L}$ and $Q_{E-L}$ are the in-phase and quadrature-phase components of the complex early-minus-late discriminator $P_{E-L}$.

13. A receiver for receiving spread-spectrum signals, the receiver including:
   a local code generator that produces a version of a code that is included in the received signal;
   a code phase generator that produces chip edge signals and phase angles that correspond to an estimated code phase;
   a carrier phase generator that produces phase angles that correspond to an estimated carrier phase;
   a code tracking delay lock loop that produces code error signals that are used to control the code rate of the code generator;
   a carrier tracking phase lock loop that produces phase error signals that are used to control the carrier phase generator;
   a correlation subsystem that includes
      an array of complex accumulation registers that collect measurements that correspond to samples at sample times that are asynchronous to code rate of the received signal, the accumulators being associated with code chip ranges that span all or a portion of one or more code chips;
      a code phase decoder that controls the complex accumulators to direct the measurements to the respective complex accumulators that are associated with the code chip ranges from which the associated samples are taken, the code phase decoder decoding values that correspond to the estimated code phase angles of the samples; and
      a processor that selectively combines the accumulated values from two or more accumulation registers to produce code tracking discriminator information for the code tracking delay lock loop and the number of code chip ranges selected for combining is reduced to narrow one or more of the delay spacings, or increased to widen one or more of the delay spacings, with a given code range that is associated with a code tracking point and a number of ranges both before and after the given range being selected for combining to determine a punctual correlation value, and a code error is determined as:

$$C_{error} = \frac{I_P I_{E-L} + Q_P Q_{E-L}}{I_P^2 + Q_P^2} \times chipsize$$

where $I_P$ and $Q_P$ are the in-phase and quadrature-phase components of the complex punctual accumulation value $P_P$ and $I_{E-L}$ and $Q_{E-L}$ are the in-phase and quadrature-phase components of the complex early-minus-late discriminator $P_{E-L}$.

14. The receiver of claim 13 wherein the processor further selectively combines the accumulated values from various code chip ranges and manipulates the results to produce phase error information for use in the carrier tracking phase lock loop.

15. The receiver of claim 13 further including
a multipath mitigation sub-system for producing multipath mitigation information for use in code tracking, carrier tracking, or both, and
the processor selectively combines the accumulated values from two or more accumulation registers to produce correlation values for the multipath mitigation sub-system.

16. A computer generated method for tracking a spread spectrum signal the method including the steps of:
accumulating over multiple code chips correlation measurements that are associated with samples of a received signal at sample times that are asynchronous to code rate to produce complex accumulated values that correspond to code chip ranges that span all or a portion of one or more code chips;
selectively combining the complex accumulated values associated with two or more code chip ranges to produce correlation values for use in one or more correlation techniques, one or more multipath mitigation techniques, or both and the number of code chip ranges selected for combining is reduced to narrow one or more of the delay spacings, or increased to widen one or more of the delay spacings, and
the array further includes a non-transition complex accumulation register that accumulates correlation measurements associated with a code chip when the code does not transition at a chip time, and, a phase error is determined as:

$$\text{Phase Error} = \arctan\left[\frac{\left(\sum_{k=p+1}^{N} I_k - \sum_{k=1}^{P} I_k + I_{NT}\right)^2}{\left(\sum_{k=p+1}^{N} Q_k - \sum_{k=1}^{P} Q_k + Q_{NT}\right)^2}\right]$$

where $I_K$ and $Q_K$ are the in-phase and quadrature-phase components of the complex value that is contained in the complex accumulation register that corresponds to bin k and $I_{NT}$ and $Q_{NT}$ are the in-phase and quadrature-phase components of the complex value that is contained in the non-transitional complex accumulation register.

17. The method of claim 16 further including in the step of selectively combining the complex accumulated values the step of selecting the complex accumulated values that combine to produce one or more early correlation values and one or more late correlation values associated with one or more desired delay spacings.

18. The method of claim 17 further including in the step of producing early and late correlation values the step of combining the early and late correlation values to produce early minus late discriminator information.

19. The method of claim 18 further including in the step of selectively combining the complex accumulated values the step of selectively varying numbers of ranges that are combined, sizes of the ranges that are combined, or both.

20. The method of claim 16 further including in the step of selectively combining the complex accumulated values the step of selecting the complex accumulated values that combine to produce correlation values that are used to produce code tracking discriminator information.

21. The method of claim 16 further including
in the step of accumulating, mathematically manipulating the accumulated values to determine intermediate values that correspond to ranges that are between the ranges associated with the accumulated values, and
in the step of selectively combining the accumulated values, combining the intermediate values instead of or in addition to the accumulated values.

* * * * *